G. F. LEWIS.
FEED PAN FOR POULTRY.
APPLICATION FILED AUG. 12, 1909.

948,014.

Patented Feb. 1, 1910.

Witnesses
E. Larson
S. E. Dodge

Inventor
G. F. Lewis,
By Deelert Robb
Attorneys

UNITED STATES PATENT OFFICE.

GEORGE F. LEWIS, OF FRANKLIN, TEXAS.

FEED-PAN FOR POULTRY.

948,014.  Specification of Letters Patent.  Patented Feb. 1, 1910.

Application filed August 12, 1909. Serial No. 512,562.

*To all whom it may concern:*

Be it known that I, GEORGE F. LEWIS, a citizen of the United States, residing at Franklin, in the county of Robertson and State of Texas, have invented certain new and useful Improvements in Feed-Pans for Poultry, of which the following is a specification.

As is well known owners of poultry have difficulty in treatment of diseases to which the feet of chickens and other fowls are subject. Usually it is necessary to chase the fowl and after it is caught a suitable remedy is applied to the feet.

The object of the present invention is to provide a novel form of feeding receptacle for poultry and which embodies a pan adapted to receive a foot bath to facilitate the treatment of diseases of the feet and without experiencing the difficulty attached to the present method of catching the fowl as before mentioned.

Figure 1:
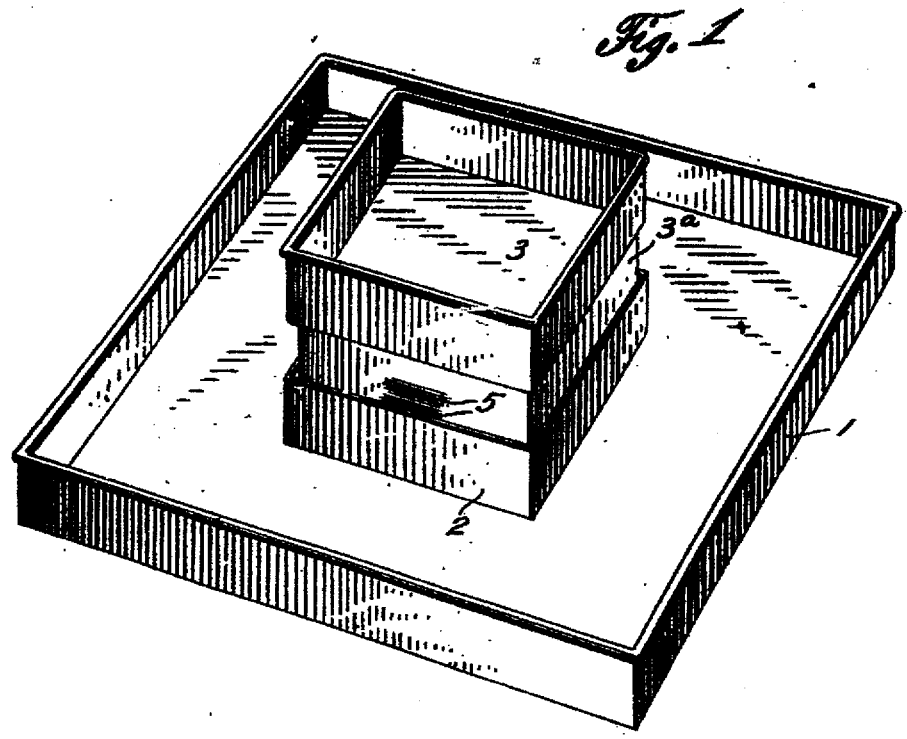
Figure 2:
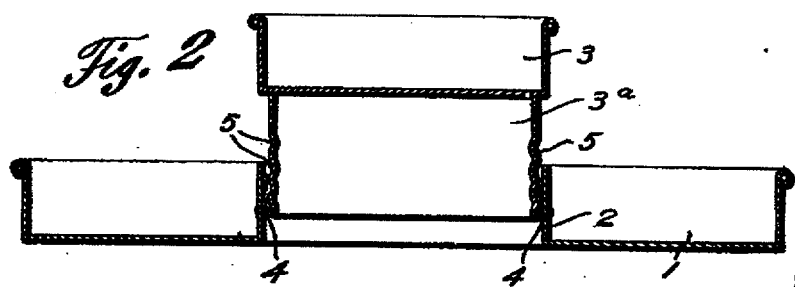

For a full understanding of the invention reference is to be had to the following detail description and the accompanying drawings, in which:

Figure 1 is a perspective view of a feeding receptacle embodying the essential features of the present invention, and Fig. 2 is a transverse sectional view showing the invention in detail.

Throughout the following description and on the several figures of the drawings similar parts are referred to by like reference characters.

The numeral 1 denotes a shallow pan adapted to receive a liquid and at the central portion of which is provided a hollow supporting standard 2 upon which is carried a food tray 3. The tray 3 is adapted to contain suitable food for the poultry and said tray is of considerably less diameter than that of the pan 1, and at the same time being elevated with respect to said pan and in a position convenient to the fowls after the latter have stepped into the pan 1. The liquid bath which is adapted to be contained by the pan 1 may have any suitable medicinal properties for treatment of the feet of the fowls, kerosene or coal oil being often used with water for such treatment. The food receptacle or tray 3 is, of course, entirely separate from the pan 1, said tray having an extension 3ª projecting from its bottom and received in the hollow standard 2 at the center of the pan 1. Suitable spring catches 4 are attached to the part 2 and adapted to engage in recesses 5 in opposite sides of the part 3ª to secure the food tray to the standard 2. A plurality of the recesses 5 may be provided on the extension 4 so that the feed tray may be held in adjusted positions to permit of the use of the device by fowls of different sizes. It is absolutely necessary that the fowls step into the bath in the pan 1 in order to feed from the tray 3.

Having thus described the preferred embodiment of the invention, what is claimed as new is:

In a poultry feeding receptacle, the combination of a shallow pan to receive a foot bath, a food receptacle of lesser diameter than the pan, a standard at the center of the pan, an extension projecting from the bottom of the food receptacle, and catches carried by the standard for detachably and adjustably supporting the food receptacle in an elevated position with respect to the pan.

In testimony whereof I affix my signatu in presence of two witnesses.

GEORGE F. LEWIS.

Witnesses:
GEO. W. DAULIN,
R. L. MOODY.